United States Patent [19]

McMahon et al.

[11] 4,278,327
[45] Jul. 14, 1981

[54] LIQUID CRYSTAL MATRICES

[75] Inventors: Donald H. McMahon, Carlisle; Richard A. Soref, Newton Centre, both of Mass.

[73] Assignee: Sperry Corporation, New York, N.Y.

[21] Appl. No.: 97,294

[22] Filed: Nov. 26, 1979

[51] Int. Cl.³ .................................................. G02F 1/133
[52] U.S. Cl. ........................... 350/347 V; 350/96.13; 350/96.14; 350/334; 350/347 R
[58] Field of Search ............... 350/347 V, 347 R, 334, 350/96.13, 96.14

[56] References Cited

U.S. PATENT DOCUMENTS

| 3,990,780 | 11/1976 | Dakas | 350/96.13 |
| 4,120,560 | 10/1978 | Baues | 350/96.14 |
| 4,201,442 | 5/1980 | McMahon et al. | 350/96.14 |

OTHER PUBLICATIONS

Kashnow et al.: "Total Reflection Liquid–Crystal Electro–Optic Device", *Applied Optics*, pp. 2309–2311, Oct. 1973.

*Primary Examiner*—Edward S. Bauer
*Attorney, Agent, or Firm*—Howard P. Terry

[57] ABSTRACT

The improved electrooptical devices provide means for switching pluralities of polarized or unpolarized optical signals between input and output multimode single strand light guides. The electrooptical switching elements employ electric field-effect liquid crystal compositions and are adapted to use in the construction of large scale, integrated multiple switching arrays.

39 Claims, 26 Drawing Figures

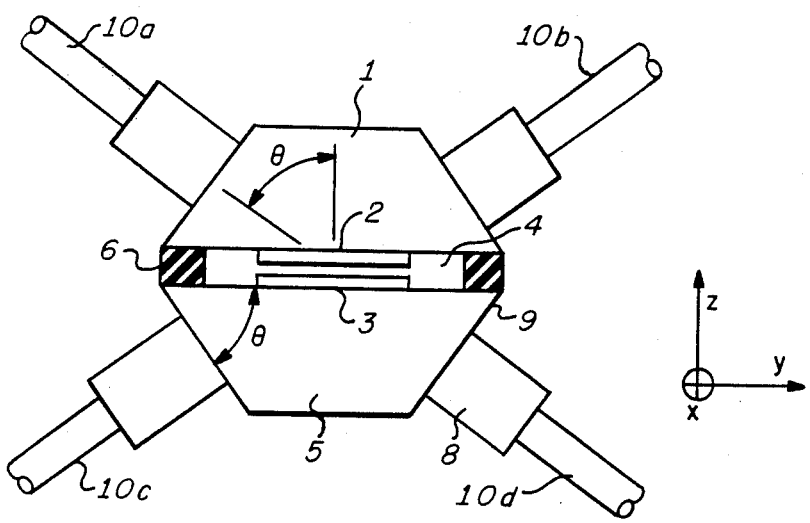
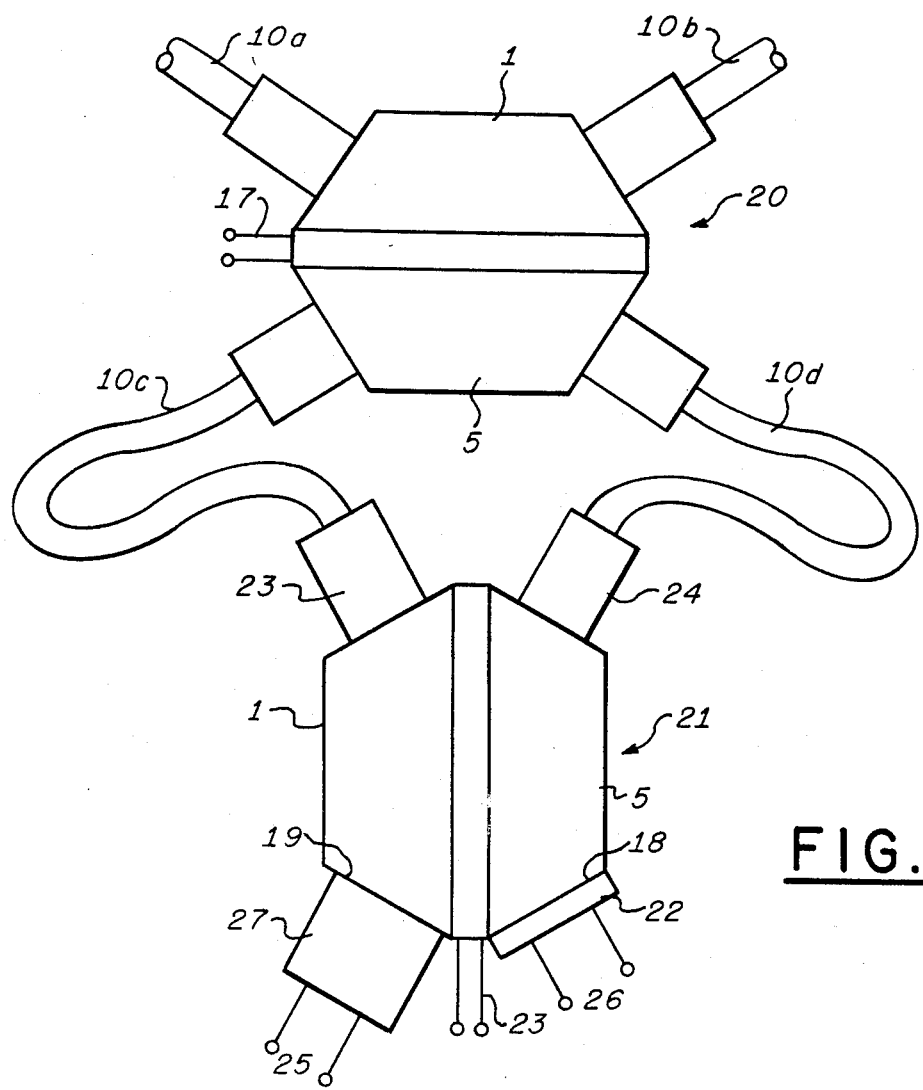
FIG.3.
FIG.4.

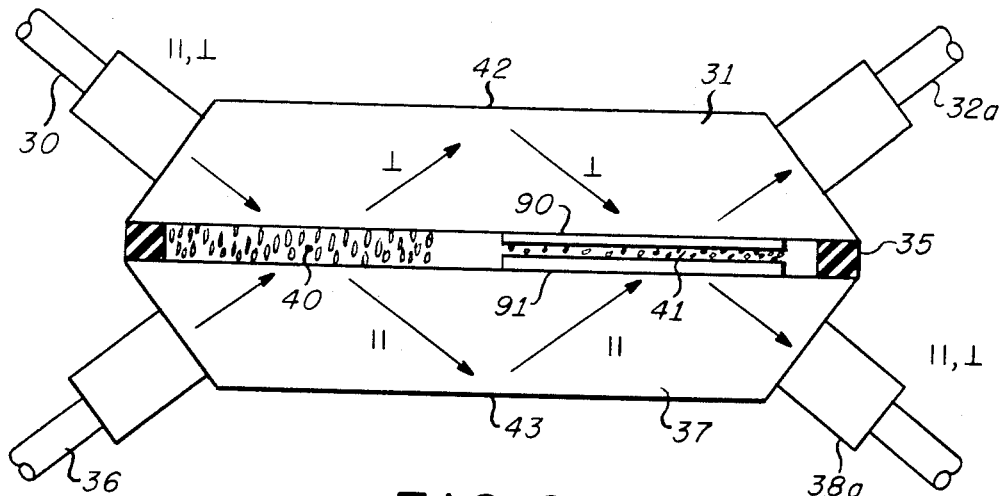
FIG.9.
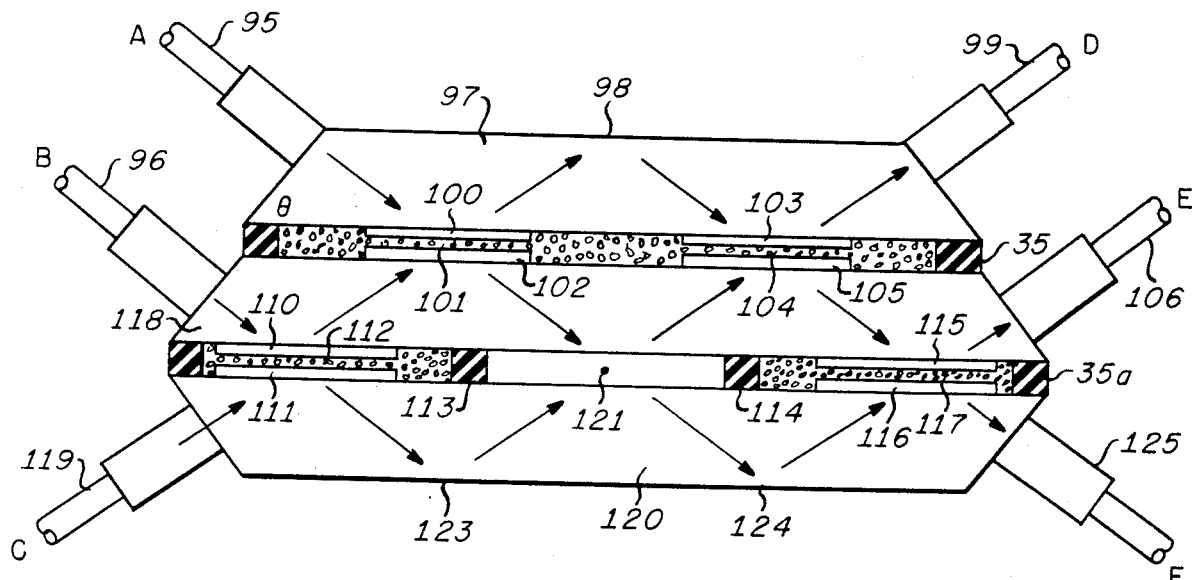
FIG.10.
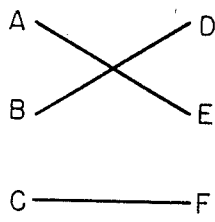 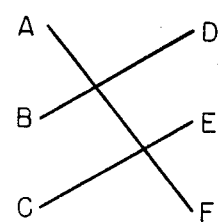 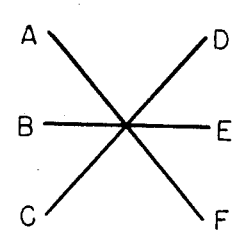 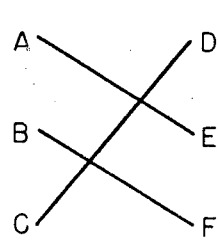
FIG.10A.   FIG.10B.   FIG.10C.   FIG.10D

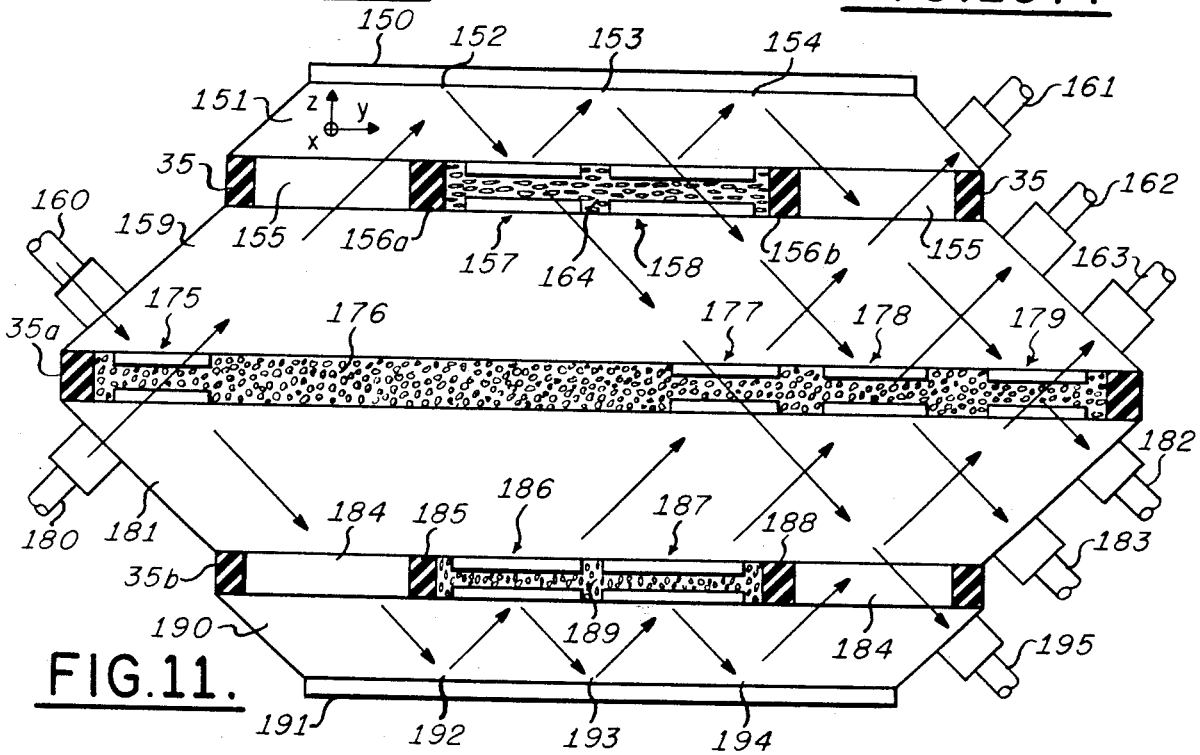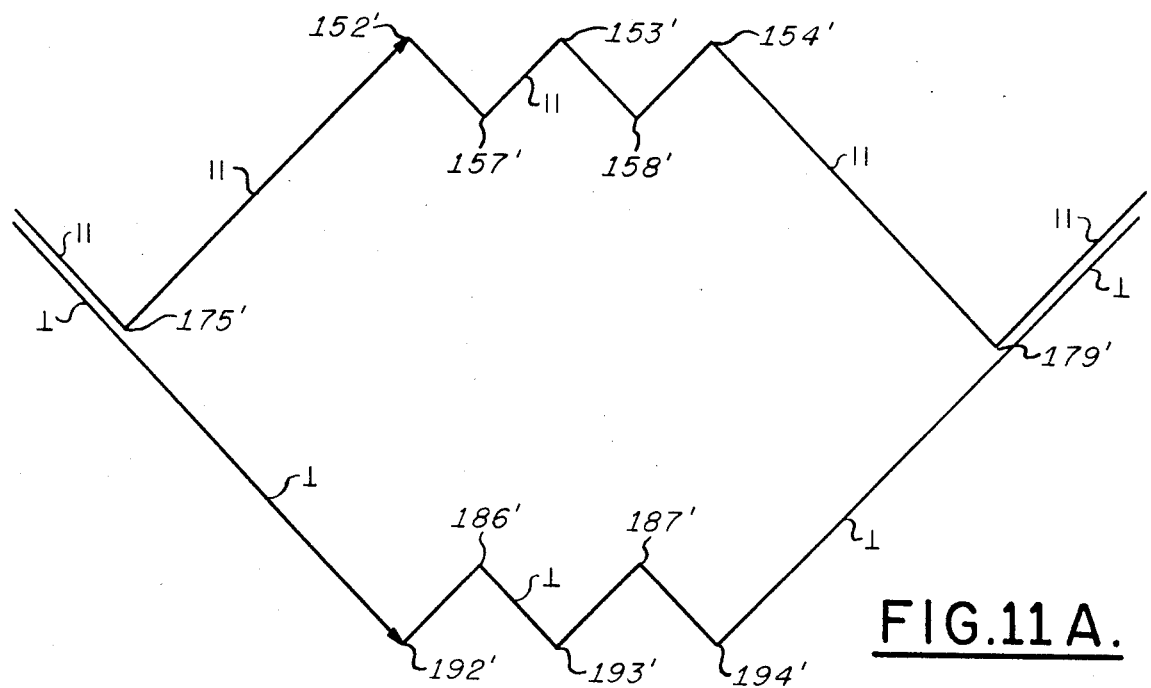

LIQUID CRYSTAL MATRICES

BACKGROUND OF THE INVENTION

1. Field of the Invention

The invention pertains to improved electrooptical devices for switching pluralities of unpolarized or polarized optical signals between input and output multimode single-strand fiber optical guides and more particularly relates to novel electrooptical switch elements and matrices employing electric field-effect liquid crystal compositions adaptable for the construction of large scale, integrated multiple switch arrays.

2. Description of the Prior Art

Best known in the prior art are optical switching devices employing electrooptical materials such as $LiNbO_3$ or $LiTaO_3$. While some success has been achieved in devising electrical field switched devices in matrix forms, the use of such solid crystalline materials imposes serious limitations. Generally, the size of available $LiNbO_3$ or $LiTaO_3$ crystals is seriously limited, and there is no apparent opportunity seen for overcoming this size limitation without extreme expense. No other known solid electrooptical materials have large electrooptic coefficients and otherwise suitable properties. With array substrate sizes limited in this manner, the number of switch elements that may be employed in matrix switches constructed of such materials is severely limited.

On the other hand, it has also been proposed to use nematic liquid crystal materials in unit optical switches; but, generally, the single switch configurations proposed have inherent geometric and other properties making them not particularly useful for combination in simple optical multiple switch matrices. For example, a liquid crystal switching matrix that might be based on the unit switch described in the technical paper "Nematic Crystal Digital Light Deflector" by G. Labrunie and S. Valette, beginning on page 1802 of volume 13, number 8 in the August 1974 issue of *Applied Optics*, would demonstrate serious defects. Though the Labrunie et al paper might suggest a honeycomb matrix configuration of optical switches made up of identical modular elements, it would be nonetheless very expensive and of doubtful competitiveness because all contiguous faces of the unit switches must be accurately ground with high optical precision, not only for achieving high optical flatness, but also so as to assure that the angles between active faces are all precisely equal and that there are no air spaces. Any departure from such precision would result in high optical losses, greatly increased scattered light, and consequent general degradation of efficiency of the matrix. This major defect of the imagined honeycomb type or organization yields only one active switching region for each elemental switch module and it is, therefore, apparent that such a strictly modular approach is not economical from at least a second viewpoint. In fact, the idea that the strict modularity of the unit hexagonal cells be retained is seen to be the seat of the aforementioned problems. Nonetheless, liquid crystal materials are characterized by large changes in optical index of refraction for only modest changes in the electric field at relatively low electric field magnitudes and have other significant advantages, as are discussed widely in the literature and, for instance, in the U.S. patent application Ser. No. 947,983, now U.S. Pat. No. 4,201,442, by D. H. McMahon and R. A. Soref for a "Liquid Crystal Switching Coupler Matrix", filed Oct. 2, 1978 and assigned to Sperry Corporation.

The faults of the prior art are further discussed in the R. A. Soref U.S. patent application Ser. No. 13,095 for "Liquid Crystal Switching Matrices", filed Feb. 21, 1979 and assigned to Sperry Corporation. The Soref invention comprises novel electrooptical matrix switches for selectively switching pluralities of optical signals between collimating output fiber light guides of the multimode, single strand kind. Switching is accomplished by selective electric field excitation of positive or of negative anisotropy liquid crystal media. The geometry of the multiple switch structure may be regarded as a hybrid between the modular and non-modular; in certain forms of the invention, sets of similar trapezoidal prismatic glass parts are economically employed and, between those glass prisms, thin planar liquid crystal layer cells are defined which may include a plurality of active electrooptic regions. The complete configuration may have one or more degrees of geometric symmetry. The assembly of prisms and liquid crystal layers may cooperate, for example, in directly light signals from three inputs to selected ones of three outputs, while certain of the prisms cooperate with light absorbers for removing unwanted scattered light.

SUMMARY OF THE INVENTION

The invention relates to improved electrooptic devices for switching unpolarized or polarized optical signals between input and output multimode single-strand optical wave guides, unit switches employing electric field effect liquid-crystal compositions and adaptable to the construction of large scale, integrated multiple switch arrays. Switching is accomplished by the selective electric field excitation of liquid crystal media confined in layers between prismatic glass elements supporting a plurality of cooperating mirror and transparent electrode systems. Switching is accomplished in a manner overcoming defects of the prior art, in that means are provided rendering operation efficiently independent of the polarization of the incoming light. Some forms of the invention further benefit because the selected liquid crystal material, in cooperation with the selected disposal of mirrors and optically active regions defined between active transparent electrodes, makes it possible to use only one type of liquid crystal material throughout each liquid crystal layer, eliminating the need for internal separating barriers and for an inert index-matching liquid employing such barriers to separate the liquid from the liquid crystal material.

The invention provides matrix switching of unpolarized or polarized light with low insertion loss, low cross-talk, low control voltages, and simple in-out optical fiber coupling elements in configurations readily permitting arbitrary expansion to relatively large arrays. Similar sets of parts are employed in such a way that manufacture of parts and assembly of the product is economical. For example, the expensive requirement of very high quality optical polishing is considerably relaxed. There are no air gaps in the structure and no moving parts and stray light is minimized. The switch matrices may be driven by low voltage, low current transistor circuits and are fail safe since there is continuous maximum optical transmission when the electrical switching power fails. The switch matrices are bidirectional and achromatic in operation.

The switching matrices are versatile, since a variety of locations for input and output fibers and for absorbers may be selected even after the glass structure is assembled. Depending upon the selected fiber connection system, the multimode fibers are easily relocated with respect to the various fixed optical parts and the fiber light is advantageously collimated or decollimated. There are no highly critical adjustments of fiber position nor of prism position; conveniently, the fibers are directly butt-coupled at perpendicular incidence. The choice of the incidence angle $\theta$ and, consequently, of the prism angle $\theta_P$ is not highly critical.

The invention is particularly adaptable for use in multimode optical signal systems and thus benefits because of the desirable characteristics of such systems. Experience in guided optical data communication methods, while earlier intensely concerned with the fiber optic bundle and with single mode integrated optical techniques, now leads to the conviction that an intermediate approach, the multimode, single fiber technology, can be most successfully applied to a wide variety of communication problems, especially where moderate band width and moderate distances are involved. Fabrication of passive interconnectors is simple and the packing fraction losses characteristic of the fiber bundle are eliminated. Simple light sources exist easily capable of coupling considerable power into available multiple mode, single fiber guides, and quite adequate photodetector devices for detecting the flow of light through such single fiber guides are also available.

BRIEF DESCRIPTION OF THE DRAWINGS

FIGS. 3 and 4 provide a further understanding of prior art optical switching systems.

FIGS. 7, 8, 8A, 8B, 9 and 9A are views, partially in cross section, of further embodiments of the unit switch.

FIG. 10 is a view in partial cross section of a dual layer matrix switch according to the invention.

FIGS. 10A through 10F are symbolic diagrams useful in explaining the characteristics of the matrix switch of FIG. 10.

FIG. 11 is a view, in partial cross section, of a matrix switch according to the invention employing three electrooptically active layers.

DESCRIPTION OF THE PREFERRED EMBODIMENTS GENERAL

Figure 1:
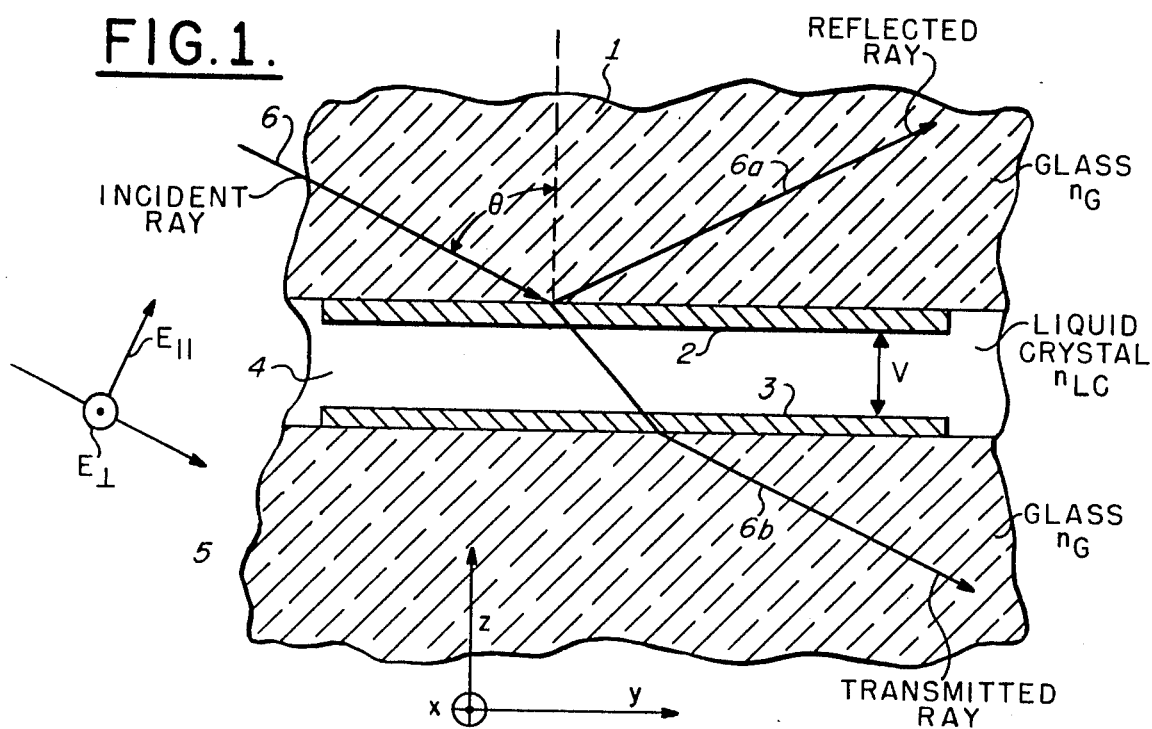
FIG. 1 is a fragmentary cross section view useful in explaining the operation of the invention.

The multimode unitary switches of the present invention, like those discussed in the aforementioned patent application Ser. No. 13,095, employ the electric field switching properties of thin planar films of aligned liquid crystals in nematic media when disposed between cooperating pairs of transparent bodies made of glass of a high index of refraction. The optical refractive index $n_g$ of the glass bodies or prisms 1 and 5 (FIG. 1) is selected to be greater than the ordinary refractive index $n_o$ of the thin liquid crystal film 4. The value of $n_g$ may be equal to, slightly less than, or slightly greater than the extraordinary index $n_e$ of the liquid crystal medium of film 4. The opposed flat, polished surfaces of the glass prism bodies 1, 5 at the interfaces with the liquid crystal film 4 may be supplied with respective opposed thin optically-transparent, sputtered, electrically-conducting layers 2, 3 preferably of indium-tin oxide prepared in the usual manner in thicknesses of 200 to 300 Angstroms. Thin films of other materials, including chromium, have also been used to form electrodes in such liquid crystal display cells. Microgrooves (not shown) may be formed in the conventional way on exposed surfaces of an insulator material such as SiO or $MgF_2$ by 60° angle-deposition of 100 Angstroms of SiO or $MgF_2$ on the electrode films 2, 3 so as to enhance uniform homogeneous ordering of the long liquid crystal molecules, especially for positive anisotropy liquid crystal materials, in a preferred direction in the absence of the electric field V. Alternatively, a small amount of a conventional surfactant material or a 500 Angstroms coating of $CaF_2$ may be used to achieve the homeotropy desired in negative liquids. When a control electric field V is applied between the conductive electrodes 2, 3, the effect of the presence of the field in the liquid crystal medium is to re-order the long axes of most of the liquid crystals, except for a negligibly small portion of the molecules at surfaces of films 2, 3. The reorientation of the molecules causes the liquid crystal film to present a new refractive index to the light of a typical light ray or beam 6.

Basically, the incoming collimated light beam 6, incident at an acute angle $\theta$ at electrode 2, is caused by the control signal V in the prior Soref application to be reflected as light beam 6a or to traverse liquid crystal film 4 as light beam 6b. The critical angle $\theta_c$ for total internal reflection of incident light beam 6 is governed by the ratio $n_{LC}/n_g$ and depends both upon the applied field V and the optical polarization $E_\perp$ or $E_\parallel$. If the optical incidence angle $\theta$ is greater than $\theta_c$ (at V=0), the incident beam is reflected as beam 6a; if not, the incident beam penetrates the liquid crystal film 4, exiting via glass sheet 5 as beam 6b. Since the thicknesses of films 2, 3, 4 are each very small, the actual deviation of the exit beam 6b is also very small.

Operation of the prior Soref arrangement of FIG. 1 further depends upon the nature of the selected liquid crystal material or composition, particularly depending upon whether it demonstrates positive or negative dielectric anisotropy. In materals with positive dielectric anisotropy, the long axes of the nematic fluid molecules generally align themselves along the applied electric field. On the other hand, in materials with negative dielectric anisotropy, the major portion of the long axes generally tend to dispose themselves at right angles to the electric field vector.

Figure 2A:
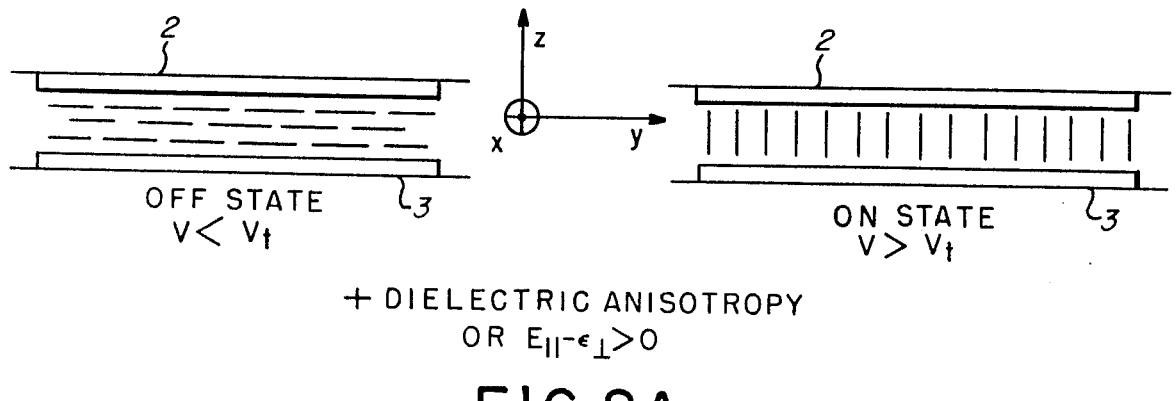
FIGS. 2A and 2B are simplified cross sectional views similar to FIG. 1 also useful in explaining the invention.
Figure 2B:
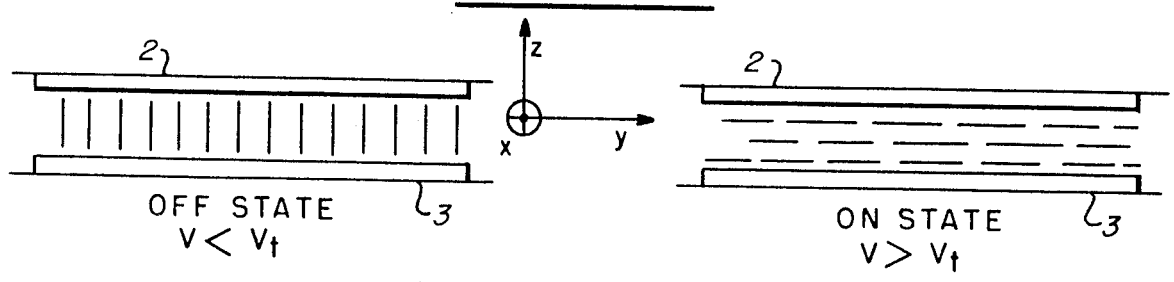

FIGS. 2A and 2B illustrate the preferred orientations of the long axes of the two types of molecules as employed in the prior Soref devices. In particular, FIG. 2A illustrates the behavior of liquid crystal molecules which display positive dielectric anisotropy ($\epsilon_\parallel - \epsilon_\perp > 0$). Here, the ordering of the long axes of the liquid crystal molecules is homogeneous and parallel to the planes of the electrode plates 2, 3 in the y direction in the OFF STATE when the electric field is zero or, more properly, less than a threshold voltage $V_t$. Raising V well above $V_t$ produces the ON STATE with homeotropic ordering with the long axes of the liquid crystal molecules perpendicular to the electrode plates 2, 3.

FIG. 2B shows the opposite behavior in the prior Soref devices of liquid crystal molecules that display negative dielectric anisotropy ($\epsilon_\parallel - \epsilon_\perp > 0$). The ordering of the long axes of the liquid crystal molecules is homeotropic and perpendicular to the planes of the electrode plates 2, 3 in the z direction in the OFF STATE when the field is less than a threshold value $V_t$. Raising the voltage V well above the threshold value $V_t$ achieves the ON STATE with homogeneous ordering with the long axes of the molecules parallel to the planes of electrodes 2, 3 in the y direction, an ordering direction depending, for example, upon the 5° angle deposition of the $CaF_2$ film.

It will be noted in connection with FIG. 1 that the incoming fiber light is usually unpolarized light which may be resolved into orthogonal components: $E_\parallel$ in the plane of incidence (the transverse magnetic or TM mode) and $E_\perp$ perpendicular to the plane of incidence (the transverse electric or TE mode). For positive dielectric anistropy liquids, both the TE and TM mode waves are polarized perpendicular to the molecular long optical axes when $V < V_t$ (the OFF STATE) and both modes are affected by the ordinary index of refraction $n_o$ of the liquid crystal film. Above the threshold $V_t$, the liquid crystal index which affects propagation of the TM mode component rises significantly to $n_e$ because light polarization for this mode is now approximately parallel to the nematic optic axis. On the other hand, the TE mode component remains affected by $n_o$ because its polarization remains orthogonal to the nematic optic axis. In the case of negative dielectric anisotropy, the TM mode light is affected by an index of refraction $n_e$ in the low voltage state, while light in the TE mode is affected by an index of refraction $n_o$. Then, for the ON STATE higher voltage, the refractive index becomes $n_o$ for both modes.

FIG. 1 has been drawn for the case in which the acute angle $\theta$ is slightly greater than $\theta_c$, or where:

$$\theta_c = \arcsin(n_o/n_g).$$

For best results, $n_g$ and $n_e$ are made equal, though it may be shown that slight departures from this equality of about two percent produce only a fraction of a dB insertion loss. Also to be considered are transmission losses from absorption in the electrode films 2, 3 and from light scattered in the imperfectly ordered liquid crystal film 4, but these losses are small. Power reflected in practice is substantially ideal for well-ordered liquid crystal materials, and transmission is close to ideal. These general characteristics of the assembly of FIG. 1 follow from its inherent characteristics and are discussed in the aforementioned Soref application Ser. No. 13,095 and elsewhere.

Also discussed liberally in the literature and in the aforementioned application Ser. No. 13,095 is a wide variety of liquid crystal materials found useful by those skilled in the art; practice of the present invention is accordingly not limited to the several examples mentioned herein. For example, there are currently many commercially available nematic liquid crystal mixtures that are insensitive to moisture and to other usual environmental factors. Moreover, there are many stable liquid crystal compositions that have refractive indices well suited for use in the present invention. Suitable liquids are those of the field effect liquids, free from field-induced turbulence effects, including liquid mixtures that have not been doped to accentuate dynamic scattering. Suitable high-index glass prisms may readily be made from commercially available flint glasses or other related widely available high index glasses.

THE NATURE OF THE PRIOR ART PROBLEMS

It will be apparent that electrooptic devices such as have just been described are seriously polarization sensitive as will be seen from FIG. 3, which is a more detailed version representative of the apparatus of FIG. 1. In FIG. 3, the symmetric opposed flint glass prisms 1, 5 (n is about 1.6) are spaced apart by a continuous peripheral hermetic seal 6 so that an active liquid crystal material may be enclosed in the volume 4. Indiumtin oxide electrodes 2, 3 are evaporated in opposed relation on the adjacent faces of prisms 1, 5; these film electrodes 2, 3 are very thin, optically transparent, and electrically conductive and form a cooperating electrode pair. It will be understood that the thicknesses of films 2, 3 and of the liquid crystal medium are very small, and that the drawing and those to follow have been deliberately drawn out of proportion for the sake of clarity. For example, the spacing between electrodes 2, 3 may be only 5 microns. The volume 4 between the flint glass prisms 1, 5 and electrodes 2, 3 is filled, for example, with a nematic field effect liquid crystal such as that known as EM Laboratories type 1132 composed of phenyl and biphenyl cyclohexanes and having a positive dielectric anisotropy of about 10.3 and an ordinary optical index of about 1.49; the material is the product number 11878 of the EM Laboratories, Elmsford, N.Y. 10532. A layer of SiO (not shown) may be placed on electrodes 2, 3 to define in a conventional manner the zero voltage ordering of the liquid crystal molecules parallel to the electrode surfaces as shown for $V < V_t$ in FIG. 2A. Graded index lenses such as lens system 8 serve as low loss couplers for light propagated between prism 5, for instance, and a conventional multimode fiber optical wave guide 10d. In this manner, the light beam is always relatively well collimated as it passes through the active liquid crystal medium in volume 4.

In FIG. 3, when the liquid crystal has positive dielectric anisotropy and is aligned in the zero voltage state as shown in FIG. 2A, light entering the prism 1 from the upper left fiber 10a along a light beam at the angle of incidence $\theta$, and also polarized parallel to the plane of incidence of the light, will be internally reflected by the liquid crystal medium in volume 4 through the exit fiber wave guide 10b. The wave guides 10a and 10b may conveniently be used as a main data bus so that the switch may be characterized as fail safe because the coupling loss between guides 10a, 10b is minimal in the zero voltage state. When a voltage (typically 10 to 50 volts) sufficiently greater than a threshold voltage $V_t$ of about one volt is applied between electrodes 2, 3, the liquid crystal molecules are realigned as in FIG. 2A ($V > V_t$) so that they are perpendicular to electrodes 2, 3. Parallel polarized light entering wave guide 10a is now transmitted through electrodes 2, 3 and the liquid crystal medium, exiting through the wave guide fiber 10d. With this same molecular alignment, perpendicularly polarized light entering wave guide 10a remains internally reflected, continuing to exit via the upper right wave guide 10b.

Such operation is idealized; in practice a finite voltage V realigns the liquid crystal molecules generally perpendicular to the surfaces of electrodes 2, 3, except for molecules disposed in a boundary layer immediately adjacent the electrode surfaces. For the latter, the alignment direction is dictated, not by the electric field, but by the character of the surface layer associated with electrodes 2, 3. One consequence of the inability to achieve total realignment of the molecules, including those in the boundary layer, is that a small but finite amount of the parallel polarized light (typically about five percent) is still reflected into wave guide 10b. Moreover, the electrodes 2, 3 themselves absorb as much as one to five percent of the light incident upon them. As a result of all of these factors, about ninety percent of the parallel polarized light entering the switch from wave guide 10a (45 percent of the total) will reach the input of guide 10d. Fresnel reflection losses may cause an additional one to two dB optical loss if not eliminated by anti-reflection coatings. In propagation within a multimode fiber wave guide, light linearly polarized in one plane is quickly converted to unpolarized light. Accordingly, it will be appreciated that the prior art light switch of FIG. 3, even under the most ideal of circumstances, will not switch more than fifty percent of an input unpolarized light beam from the bus output guide 10b to a local terminal wave guide port 10d.

It will be understood that optical switching configurations in actual practice will often not employ merely one switching unit such as that of FIG. 3, but will use pluralities of such units where its inherent problems may be multiplied. The switch of FIG. 3 may, for example, be used to connect an input bus optical guide to a light detector and an output bus guide to a light source. Such a simple terminal system could be used in a loop data link configuration wherein light travels only in one direction, say clockwise, between all light sources and all light detectors. The device of FIG. 3, by virtue of its inherent inability to handle both light polarizations, introduces additional 3 dB input and output coupling losses between two terminals of a link, as well as connector losses. Accordingly, if additional of the FIG. 3 units are introduced to collect or to transmit light with respect to either bus direction, additional 3 dB loss factors arise. For example, the configuration of FIG. 4 represents an application of a pair of the unit switches of FIG. 3 as a terminal in a half-duplex bus using one fiber strand, the first switching unit 20 functioning exactly in the same manner as the unit of FIG. 3 when a control voltage is applied to terminals 17 of electrodes 2, 3 (not shown). The fiber optic wave guide port 10c of prism 5 is coupled to the input collimating lens 23 of prism 1 of switch 21, while the port 10d of switching unit 20 is coupled to the lens 24 of prism 5 of switch 21. The angled face 19 of prism 1 of switch 21 is equipped with a conventional light source 27 with electrical terminals 25; furthermore, the angled face 18 of prism 5 of switch 21 supports a conventional optical energy detector unit 22 with electrical terminals 26. Electrodes similar to electrodes 2, 3 of FIG. 3 may be activated by electrical signals supplied to leads 23.

In the structure of FIG. 4, the second switching unit has been added to permit light to be transmitted or received from either bus direction (10a to 10b or vice versa). Aside from the aforementioned coupling losses, the addition of switch 21 injects a total of about 10 dB input-output loss between the terminals 10a and 27 or 22 (or between 10b and 27 or 22). While the ability to transmit and receive from both directions provides versatility, a 3 dB penalty is necessarily introduced.

THE BASIC INVENTION

Figure 5:
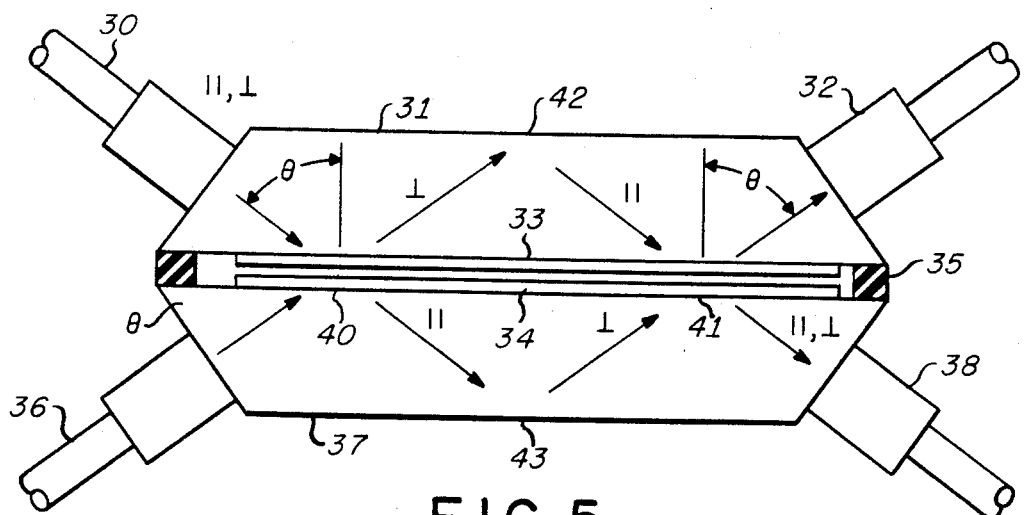
FIG. 5 is a view, partially in cross section, of a basic form of the novel unitary switch.

It will be understood that the present invention avoids the defects of the aforementioned prior art, providing optical switching structures that function efficiently in a manner independent of the polarization of the input light. Such may be accomplished, for example, as shown in FIG. 5 in a double-pass structure using a single layer of liquid crystal, and using the same incidence and prism angles $\theta$, but requiring longer prisms 31 and 37 and using, for example, extended electrodes 33 and 34. The extended prisms and electrodes permit input light beams to intercept the liquid crystal layer between electrodes 33, 34 at angle $\theta$ in two symmetrically disposed locations 40, 41, each beam undergoing reflection at the outer surfaces of the prisms at the symmetric locations 42, 43. As in FIG. 3, only the barrier 35 is seen in cross-section in FIG. 5, the prisms and electrodes not having been sectioned as a matter of convenience in keeping the drawings uncluttered. Again, the light beams are collimated and decollimated by the cooperative action of graded index lenses such as at 32 and 38. Like the collimating devices in FIGS. 3 and 4, the devices 32, 38, et cetera, of FIG. 5 may take various forms, though a preferred device is an arrangement in which a collimating or decollimating fiber optic guide element may itself be inserted in a conventional way into a plug or fitting affixed to the associated prism face. By creating and by collecting quasi-collimated light, the collimating-decollimating elements have a beneficial effect in providing lower cross-talk in the switching array. Such devices are described in the literature, including the U.S. Pat. No. 3,894,789 to Kobayashi et al. The selected lens preferably has three features for use in the present invention: the lens length is exactly a fourth of the wave guide pitch so as to image the fiber core source at infinity, the lens numerical aperture is greater than the fiber core numerical aperture, and the lens outside diameter must exceed the fiber cladding diameter. Also of interest are the arrangements of the Holzman U.S. Pat. No. 4,119,362 and of the paper "Microlenses for Coupling Junction Lasers to Optical Fibers", Applied Optics, January 1974, page 89, by L. G. Cohen et al. Other conventional devices may be employed, such as those that may be purchased under the trade name Selfoc from the Nippon Sheet Glass Company, 3 New England Executive Park, Burlington, Mass., by specifying, for example, product SLW with L=5.2 mm.=0.25 p, diameter=2 mm., and N.A.=0.50.

In FIG. 5, it is assumed that the $V < V_t$ state holds the liquid crystal molecule along axes parallel to the electrodes 33, 34, as in the left part of FIG. 2A. In FIG. 5, if $V >> V_t$, light flowing into port 30 and having both parallel and perpendicular plane polarized components will be divided at point 40, the perpendicularly polarized part being reflected at 40 while the parallel polarized part is transmitted through the liquid crystal layer between electrodes 33, 34. Thus, the light beam from port 30, depending upon its polarization state, internally reflects at the mirror surfaces 42 or 43 or the respective prisms 31, 37 between liquid crystal light intercept points 40, 41. Ideas of merit implicit in the FIG. 5 structure are that the geometry uses only one liquid crystal layer and the structure is easily manufactured using conventional techniques such as are generally discussed in the aforementioned Soref application Ser. No. 13,095. Also, assuming that the electric fields applied at both liquid crystal intersections 40 and 41 are the same at any one time, the polarizations of the light beams leaving point 40 can be appropriately manipulated by introducing an element for changing the polarization states of both upper and lower light beams between the interception points 40, 41, as at 42 and 43, respectively.

Without yet considering particular mechanisms for achieving the desired result, let the result be considered with respect to FIG. 5. For this purpose, assume that the liquid crystal molecules are aligned parallel to electrodes 33, 34, as at the left in FIG. 2A, for $V=0$; in this case, both polarization components $\perp$ and $\parallel$ entering guide 30 are internally reflected at intersections 40, 41 and light entering guide 30 must exit only via the decollimating lens 32 and its associated fiber optic guide. Similarly, light entering guide 36 must exit through lens 38. If a voltage $V >> V_t$ is applied to electrodes 33, 34 sufficient to realign the long axes of the liquid crystal molecules perpendicular to electrodes 33, 34, parallel polarized light is transmitted by the nematic layer and the perpendicularly polarized light is reflected. Hence, unpolarized (or randomly polarized) light, as designated at input fiber 30 by the symbols $\parallel$, $\perp$, will be broken into its components. The perpendicularly polarized component $\parallel$ will be reflected at 40, 42, and 41 into output lens 32. The parallel polarized component $\parallel$ will be transmitted at its first intercept 40 with the liquid crystal medium into output lens 32.

Now assume that as-yet undefined elements are located symmetrically at or near the reflection points 42, 43, these elements being capable of converting parallel polarized light into perpendicularly polarized light, and vice versa. Thus, while the beams are propagating to the right in FIG. 5, the polarization state in prism 31 is converted to parallel as shown in the figure and that in prism 37 is converted to perpendicular. In this manner, the parallel polarized components from the vicinity of point 42 are transmitted through the second liquid crystal interface at point 41, while the perpendicularly polarized light from 43 is reflected at 41, both components arriving at the output lens 38. The net result is that substantially all of the incident unpolarized or randomly polarized light entering by light guide 30 exits via the opposite output at collimating lens 38, light which exited at port 32 when $V=0$. Light entering guide 36 also exits via output lens 32 when $V >> V_t$, independent of polarization. Hence, if each of the polarization states may be changed between the liquid crystal intersections 40, 41, an efficient, polarization-independent liquid crystal switch is generated.

Figure 6A:
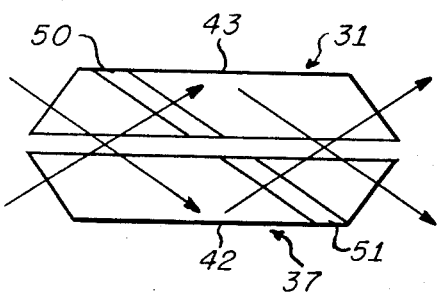
FIGS. 6A through 6D are similar to FIG. 5 and represent further basic forms of the invention.
Figure 6B:
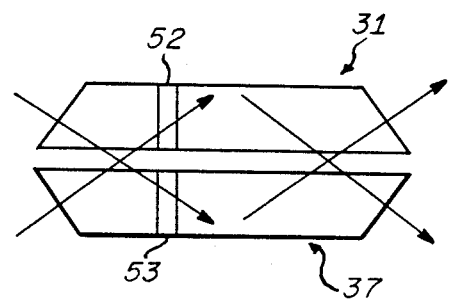
Figure 6C:
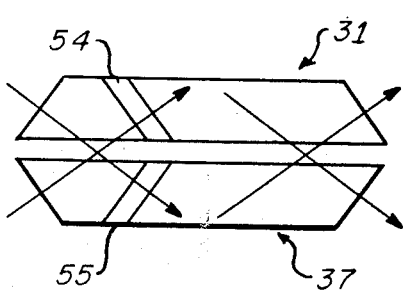
Figure 6D:
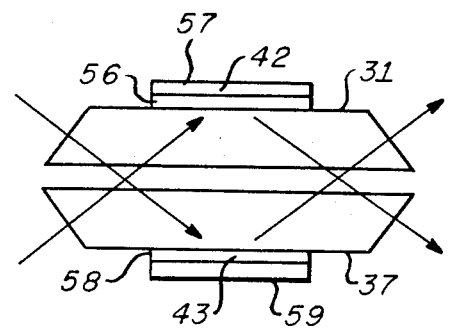

One general method for obtaining the necessary change in polarization state can be obtained according to the present invention by the strategic use of optical half wave plates as generally illustrated in FIGS. 6A through 6D, each of which corresponds generally to the structure shown in FIG. 5, though only the prisms 31, 37 are shown for simplicity, along with arrows indicating light paths. In FIGS. 6A, 6B, 6C, each prism of the pairs 31, 37 is formed in two cooperating parts with optical half wave plates interposed and cemented between those parts with a conventional transparent medium. In FIG. 6A, plates 50, 51 are a half wave thick in the direction of the light rays traversing them and lie in a common plane. A mirror image of the structure of FIG. 6A may also be used. In FIG. 6B, effective half wave sheets 52, 53 may be placed in the respective prisms 31, 37 generally at right angles to the plane of the liquid crystal layer. Again, a mirror image configuration may be used. There is no limitation to the perpendicular arrangement of FIG. 6B, since the half wave plates 54, 55 of FIG. 6C may be arranged perpendicular to the incident light rays. A simpler and therefore preferred form of the invention is shown in FIG. 6D, in which the necessary polarization conversion is achieved at the incidence points 42, 43 by affixing at these points properly oriented thin quarter wave layers 56, 58 of birefringent material with cooperating mirrors 57, 59. The arrangement is evidently convenient, because incorporation of elements in the interior or prisms 31, 37 is avoided.

Figure 7:
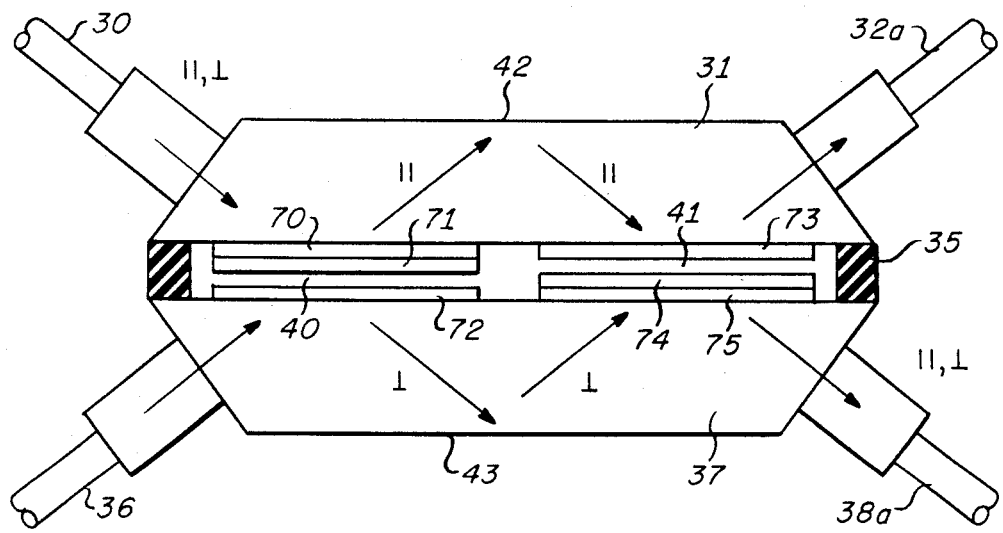

The desired change in polarization state may be achieved without modifying prisms 31, 37 in the manner illustrated in FIG. 7. The same liquid crystal orientation is used throughout the volume of the liquid crystal medium; i.e., the crystal long axes are parallel to the layer as at the left in FIG. 2A for the $V=0$ state. A thin birefringent plate 70 is affixed to prism 31 at a location before the light incident to input 30 reaches the intersection 40 and a transparent electrical electrode 71 is affixed thereto. Opposite electrode 71, a similar electrode is affixed to the surface of prism 37 interfacing with the liquid crystal medium. The half wave plate 70 has an index of refraction substantially equal to or higher than that of prisms 31, 37 and that of the liquid crystal medium for both light polarization states. At the intersection 41, a transparent electrode 73 is affixed to prism 31, while a half wave plate 75 is affixed to prism 37 and a cooperating transparent electrode 74 is attached thereto. It is noted that plate 75 is disposed on the prism 37 that is opposite the prism 31 on which plate 70 is disposed.

Parallel polarized components of light entering prism 31 via guide 30 are converted to perpendicular polarized light in half wave plate 70 and are therefore reflected by the nematic material, whether or not a voltage is coupled across electrodes 71, 72. Upon reflection of the light, half wave plate 70 reconverts it into parallel polarized light before flow toward point 42. The parallel polarized components are transmitted at the second liquid crystal intersection 41 toward exit 38a if the liquid crystal electrodes 73, 74 are excited with a voltage $V > V_t$, but will be reflected to 32a if the liquid crystal material is not excited. On the other hand, perpendicularly polarized light entering input guide 30 is converted to parallel polarized light by plate 70 then is reflected toward point 42 by the nematic layer if it is electrically unexcited and is transmitted toward point 43 if the electric field is present across the nematic layer. Moreover, when the parallel polarized light is transmitted at the first liquid crystal interface 40, it is converted to perpendicularly polarized light at the second half wave plate 75 and is reflected at the liquid crystal intersection 41, reconverted to parallel polarized light, and therefore exits via light guide 38a. Thus, it is seen that all light of both polarizations exits via output 32a if no electrical excitation is applied to the liquid crystal layer. Furthermore, all such light exits via guide 38a when suitable excitation is applied to the liquid crystal medium. In the same manner, light of any polarization entering guide 36 may be selectively directed to output guides 32a or 38a. The reciprocity theorem applies in such a manner that light entering either guide 32a or guide 38a may be selectively directed to guides 30 or 36 according to the electric fields placed across the liquid crystal.

Figure 8:
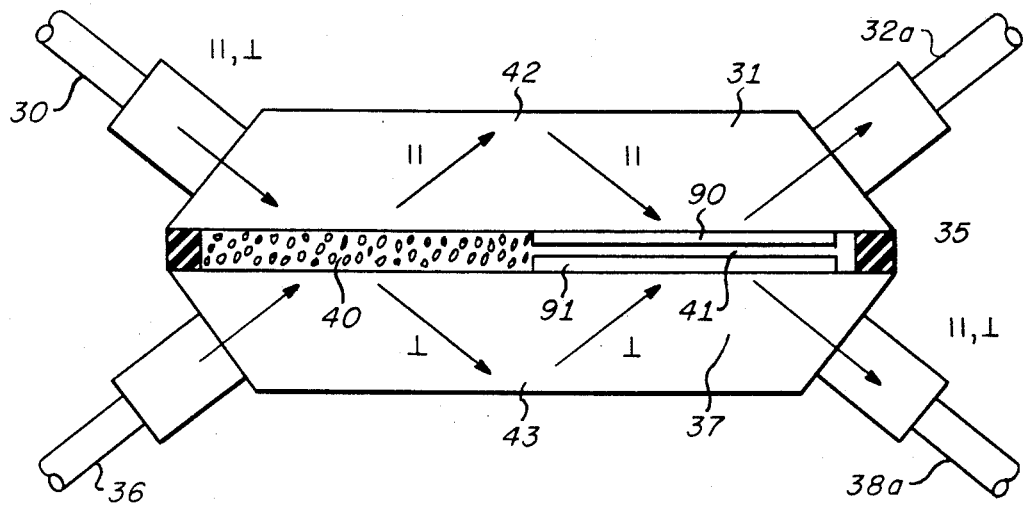

A further embodiment of the invention is disclosed in FIG. 8 which is attractive because it uses fewer parts, is simpler, and is more economical to build than the structures of FIGS. 6 or 7. This apparatus uses a novel, unconventional V=0 alignment shown in FIG. 8A wherein the long axes of the liquid crystal molecules are perpendicular to the drawing for $V<V_t$ and are therefore also perpendicular to the disposal seen in FIGS. 2A, 2B. In other words, the long axes are perpendicular to the propagation direction of the $E_\parallel$ and $E_\perp$ beams and parallel to the glass prism substrates. Generally, the structure of the FIG. 8 apparatus is like that of previously described embodiments, but electrodes 90, 91 extend only just so far as to apply an electric field across the liquid crystal layer about the second light beam intersection 41. In this manner, the axes of the molecules are always in a fixed state in the vicinity of intersection 40 (the perpendicular state as indicated by dots) and no electrodes are required there. The V=0 orientation of the molecules at the intersection is indicated by dots in FIG. 8.

Figure 8A:
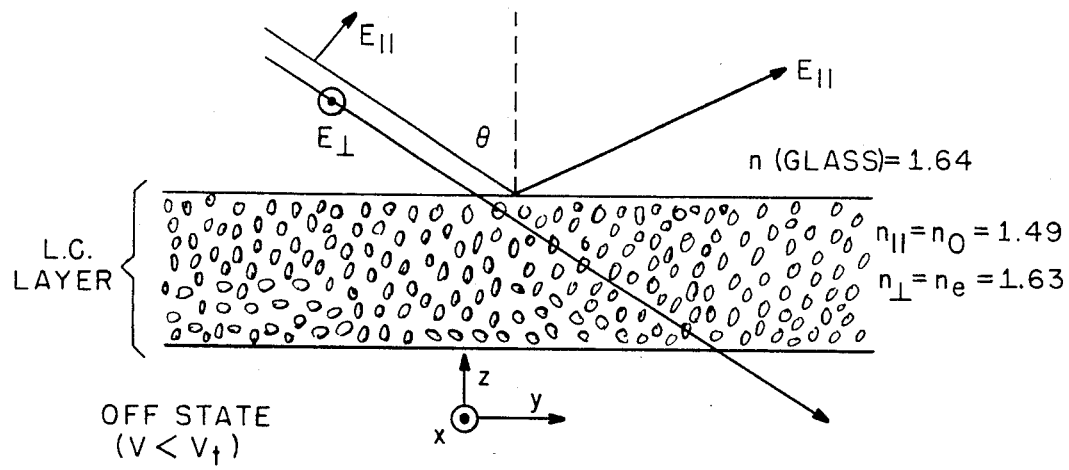
Figure 8B:
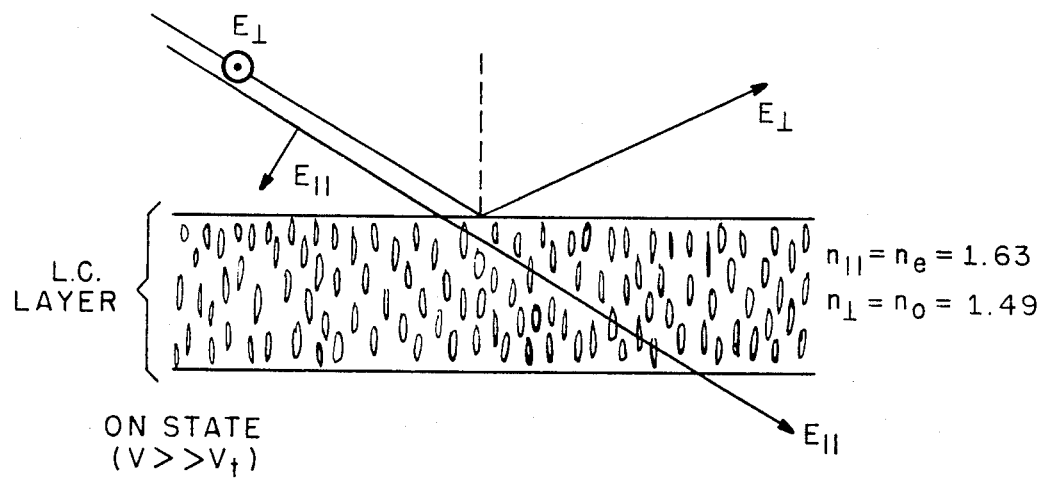

If unpolarized or randomly linearly polarized light enters prism 31 in FIG. 8, which is preferably a flint glass prism, the first liquid crystal intersection 40 always transmits perpendicularly polarized light components and always reflects parallel polarized components, as illustrated in FIG. 8A. The liquid crystal material at intersection 40 therefore acts merely passively to separate the input light into beams of the two orthogonal polarization states, one traveling toward reflection point 42 and the other toward reflection point 43. The reflection points 42, 43 produce equi-angle incidence from opposite sides at point 41. In operation, when there is no electric field applied between electrodes 90, 91 and the liquid crystals are therefore aligned in the same manner throughout the liquid crystal volume, the liquid crystal material about point 41 transmits perpendicularly polarized light into output wave guide 32a; in addition, it reflects parallel polarized light when this liquid crystal is unexcited also into output guide 32a. In other words, for no excitation voltage, the perpendicularly polarized light is retransmitted and the parallel polarized components are re-reflected at the second liquid crystal intersection 41 so that all of the light flows out of wave guide 32a. If the liquid crystal material between electrodes 90, 91 is subjected to a field $V>>V_t$, the liquid crystal molecules there align perpendicular to the plane of the liquid crystal layer and, as shown in FIG. 8B, the opposite flow of light obtains; namely parallel polarized light is transmitted and perpendicularly polarized light is reflected in the vicinity of point 41. Hence, when the liquid crystal at 41 is electrically excited, both polarizations exit collinearly via the output wave guide 38a.

It is observed that the high index prisms 31, 37 are long enough to accommodate two passes of the light from input guide 30 (or 36) through the liquid crystal layer, as well as two totally reflective intersections 42, 43 at outer surfaces of prisms 31, 37, respectively. The prisms 31, 37 have a refractive index $n_g$ that satisfies the relation $n_o < n_g < n_e$, where $n_o$ and $n_e$ are the respective ordinary and extraordinary indices of refraction of the liquid crystal medium. The obliquely incident light beam from guide 30 of FIG. 8 ($\theta=67°$ typically) consists of parallel and perpendicular components. The liquid crystal presents different indices to these polarizations; i.e., $n(\parallel, V_1)=n_o$ and $n(\perp, V_1)=n_e$, where $V_1<V_t$. Recalling that the total internal reflection angle is:

$$\theta_c = \sin^{-1} n_{Lc}/n_g$$

It is then found, in a typical case, that $\theta_c(\parallel, V_1) \approx 65°$, and that $\theta_c(\parallel, V_1) \approx 84°$. This means that the parallel light is totally reflected by the liquid crystal medium at 40 ($\theta > \theta_c(\parallel)$), and that the perpendicularly polarized light is substantially totally transmitted into the output port 32a ($\theta < \theta_c(\perp)$) both for the condition V=0. In the presence of a voltage $V>>V_t$ across electrodes 90, 91, the effective refractive indices of the liquid crystal become interchanged relative to the V=0 state. In the $V>>V_t$ state, the parallel polarized light is totally transmitted and the perpendicularly polarized light is totally reflected, but now into the output port 38a. Similarly, unpolarized light entering port 36 is totally sent to port 38a when V=0 and totally into port 32a when $V>>V_t$. This means that the device is a true four-port optical reversing switch.

In one experimental model of the FIG. 8 structure, the liquid crystal employed was the previously mentioned E. M. Laboratories type 1132 nematic mixture with refractive indices of $n_o=1.492$ and $n_e=1.634$ at $\lambda=643$ nanometers. The polished prisms 31, 37 were made of optical glass of type WG 360 furnished by the Schott Glass Company, 400 York Avenue, Duryea, Pa. 18642 and having an index of 1.644 at 643 nanometers. Electrodes 90, 91 spaced five microns apart were made of 350 Angstrom thick indium tin oxide with a sheet resistance of about 1000 ohms per square. The electrodes 90, 91 were then covered in the usual way, as well as the directly associated bare glass surfaces of prisms 31, 37 (intersection 40), with a 200 Angstrom layer of silicon monoxide, vacuum deposited at a 30° angle to the substrate plane (the z-y incidence plane). In the figures, it will be understood that the reflectivity of reflection points on the prism outer surfaces may be augmented by adding metallic reflectors or mirrors at points 42, 43 and 98, 123, 124 of FIG. 10.

Figure 9A:
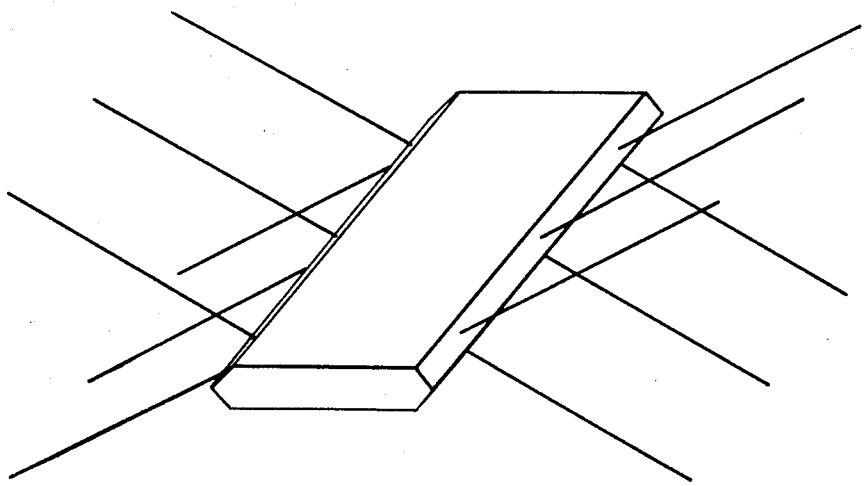

It is desirable, as in the aforementioned Soref application Ser. No. 13,095, to form matrix arrays according to the present invention. For this purpose, it is particularly desirable that the switch element be so constructed that, in the unexcited state of the liquid crystal, the output light beam maintains substantially the same direction as its entrance direction. The switching element of FIG. 9 has this desirable property. It will be seen that FIGS. 8 and 9 are very similar in nature; however, the ordering of the liquid crystal molecular axes at the non-electroded area 40 in FIG. 9 is vertical rather than horizontal, the homeotropic ordering being produced by conventional surface treatment. Accordingly, perpendicularly polarized light incident from 30 in FIG. 9 at point 40 is reflected toward the reflection point 42, while parallel polarized light $E_\parallel$ is transmitted through the layer at point 40. In the electroded region 42, the quiescent V=0 ordering is horizontal with the molecular axes perpendicular to the light beam propagation as indicated by dots in FIG. 9. Note that it is quite feasible to have two different liquid crystal alignments in the same switch volume. As a consequence, $E_\perp$ light is reflected at 42 and $E_\parallel$ light is reflected at 43. Now, if an electric field is applied across electrodes 90, 91, the molecular axes therebetween become vertical as in FIG. 8B. Consequently, the parallel polarized light components are transmitted by the liquid crystal material at point 41 toward output guide 32a. Furthermore, the perpendicularly polarized components are reflected at 41 so that they, too, exit through the same output guide 32a. Both polarizations exit collinearly through port 32a, which is desired for the ON state of a cross point switch in a matrix; whereas, in the V=0 unaddressed OFF state of the switch, the unpolarized input light travels totally to output port 38a as is desired in crossbar arrays. The structure shown in FIG. 9 exhibits substantially no leakage toward the cross ports when electrodes 90, 91 are unexited and is therefore particularly suitable for use in matrix switches.

MATRIX SWITCHES

The particular structures shown in FIGS. 7 through 9 have many applications in themselves wherever it is desirable to switch substantially all of an incoming unpolarized light beam between pairs of multimode optical fiber output wave guides in response to selectively applied voltages with no adverse effects due to the unpolarized nature of incoming light waves. Such low-loss, four-port optical reversing switches have numerous applications, including applications in active optical couplers, bypass switches, and bistable logic devices. In addition, each switching element may be replicated in a direction at right angles to the plane of the drawings of FIGS. 7 through 9, as in the three-fold replicated example of FIG. 9B, so that an elongate integrated structure is produced for switching signals in an array of data busses by single or by multiple control voltage sources. Each fiber in FIG. 9B has its own independent pair of control electrodes. Furthermore, the elemental switches may also be used in matrix configurations to perform more sophisticated switching functions such as multi-pole and crossbar matrix switching.

A matrix switch employing two liquid crystal layers and three prisms, two of which are geometrically similar and using the principles of the present invention, is illustrated in FIG. 10. The two similar prisms 118, 120 are spaced apart with their similar faces in proximity to form one liquid crystal layered volume additionally defined by gasket 35a. A smaller prism 97 is spaced apart with its longer surface proximate the shorter face of prism 118 to form a second liquid crystal volume additionally defined by a peripheral gasket 35. The input ports 95, 96, 119 are associated, as in the preceding figures, with respective input faces of the prisms 97, 118, 120; while the output ports 99, 106, 125 are similarly butt-sealed to output faces of those same prisms (the functions of the input and output faces may be interchanged). The liquid crystal interface between prisms 97, 118 is provided with opposed transparent electrodes 100, 102 at light beam intersection 101. A second intersection 104 in the same liquid crystal layer employs similar transparent electrodes 103, 105. The long axes of the molecules are selected to be perpendicular to the plane of the drawing for V=0 as in FIG. 8A. Between the intersection points 101, 104 on the outer surface of prism 97 is located a totally reflective surface or external mirror at 98.

Between the mutually similar prisms 118, 120, three separated layered volumes are supplied. The middle one of these, defined between barrier gaskets 113, 114 is a volume including a light beam intersection 121, the layer volume being occupied by an inert or electrooptically inactive transparent fluid whose optical index of refraction matches that of the adjacent prisms 118, 120. Such liquids and mixtures of liquids are well known in the art and may be formed in well known ways. A solid plate having similar optical properties may be substituted if air voids are prevented. At light beam intersections 112, 117, spaced equally on each side of the central intersection 121, are placed pairs of transparent electrodes 110, 111 and 115, 116. On the outer surface of prism 120 is located a pair of reflecting regions or mirrors at the respective points 123, 124.

The FIG. 10 matrix switch represents a one hundred percent transmission switch with two spaced-apart liquid crystal layers defined by three simple glass prisms; it is a limited three by three fiber optic matrix with four out of six matrix configurations allowed and two forbidden. In the configuration of FIG. 10, the four states illustrated in FIGS. 10A to 10D represent the four possible one hundred percent switching states for unpolarized or random linear polarized light. The forbidden states are represented in FIGS. 10E and 10F. As previously noted, this behavior obtains with the long axes of the molecules perpendicular to any one of the several electrode pairs when $V>>V_t$ for that pair and when the axes are perpendicular to the drawing when $V<V_t$.

The apparatus of FIG. 11 represents an application of the invention in what may be characterized as a 2 to N or N to 2 fiber optic switch using only three liquid crystal layers and four glass prisms. With randomly polarized or unpolarized input light at fiber optic guides 160 or 180, there is one hundred percent switching with respect to each of the six output port guides 161, 162, 163, 182, 183, and 195. The structure is symmetric about a central plane (horizontal in the drawing) and is particularly characterized by the use of a liquid crystal at that plane of symmetry displaying first characteristics and a liquid crystal material displaying second characteristics for the two layers spaced apart on either side thereof.

Proceeding from the top of the figure, the first tier of the device includes a prism 151 having the usual angle light transfer faces, wave guide port 161 being mounted upon one of those faces. The second tier of the device is formed by a somewhat larger prism 159 also having similarly angled light transfer faces. Fiber optic wave guide 160 is fixed in abutted relation to one such angled face, while the opposite angled face accommodates two similar wave guide ports 162, 163. A third tier employs a prism 181 similar to prism 159 but reversed so that its longitudinal face spaced from prism 159 has the same length as that of the prism 159 longitudinal face. Finally, a fourth tier is formed by a prism 190 similar to prism 151 but again reversed with respect thereto. The third tier prism 181 is equipped with a single input port 180 and a pair of output ports 182, 183 in mirror image relation to the ports of prism 159. Like prism 151, the corresponding prism 190 has a single port 195.

Between prisms 151 and 159, 159 and 181, 181 and 190 are disposed active layers generally individually constituted as previously described and cooperating with strategically positioned layered active liquid crystal materials between transparent electrodes and with passive layered regions. In addition, the exterior longitudinal faces of the two small prisms 151, 190 are respectively equipped with totally reflecting mirrors or surfaces 150, 191, formed in the usual manner.

The interface layer between prisms 151, 159 is enclosed in the usual way by a peripheral wall 35. A cooperating barrier 156a forms a region 155 at one end of the layer in which is sealed an index-of-refraction matching liquid. In a centrally located part 164 of the layer are disposed two independent pairs 157 and 158 of transparent electrodes for interaction with a first liquid crystal material. In this case, the liquid crystal material at 164 is a nematic layer with homogeneous molecular orientation parallel to the y coordinate (horizontal in the plane of the drawing) at V=0; the liquid is referred to hereinafter as the type A liquid and is a postive anisotropy material. The liquid crystal material is retained in its layer by the barrier wall 156b, which also functions to retain an index-matching material in the layer region 155 between barrier 156b and the exterior wall 35. In this manner, two common electrically active layered regions are defined disposed between two electrically inactive regions 155, 155.

The large interface layer at the plane of partial symmetry of the device in FIG. 11 comprises one of a liquid crystal material contained within the peripheral wall 35a. This layer has four active regions with sets of independent transparent electrodes 175, 177. 178, and 179; the latter three pairs of electrodes are spaced widely apart from the electrode pair 175. The material contained in the layered volume 176 is not the same as that of layer portion 164, but is a nematic liquid crystal with homogeneous molecular long axis orientation parallel to the x axis at V=0 and will be referred to as a type B liquid. Again, a positive anisotropy liquid is selected.

The third interface layer, lying between prisms 181 and 190, is similar to that between prisms 151, 159 differing mainly in using the same positive anisotropy type B nematic material as is used in layer 176; i.e., a nematic material demonstrating homogeneous orientation of the long crystal axes parallel to the x axis at V=0. The liquid is enclosed within a peripheral wall 35b. A cooperating inner barrier 185 forms a region 184 at one end of the layer in which is sealed an index-matching fluid. In a centrally located part 189 of the layer are disposed two independent pairs 186, 187 of transparent electrodes for interaction with the second liquid crystal material. The latter is retained in region 189 by a second interior barrier 188, which also operates to retain an index-matching material in the layer region 184 between barrier 188 and the exterior wall 35a. Again, two common electrically active layered regions are defined about location 189, disposed between the two electrically inactive regions 184, 184.

Using the principles taught in connection with FIGS. 1 through 9, it will be recognized by those skilled in the art, for example, that an unpolarized or randomly polarized light beam injected either into port 160 or into port 180 in FIG. 11 may be directed in its entirety, by selective excitation of cooperating electrode pairs 157, 158, 175, 177, 178, 179, 186, or 187, into any one of the opposed ports 161, 162, 163, 182, 183, or 195. In a similar manner, randomly polarized signals injected into ones of the latter ports may be directed either to port 160 or to port 180. This may readily be verified as is done in the typical example of FIG. 11A, which illustrates one particular set of ray paths through the matrix switch of FIG. 11. In FIG. 11A, perpendicular and parallel polarized components of a light ray enter port 160. The type B liquid with V=0 at location 175' causes the parallel polarized component to be reflected, while the perpendicularly polarized component is transmitted. Following the reflected parallel component, it is reflected at locations 152', 153', and 154' by mirror 150, having also been reflected by the two intersections at locations 157, 158 with type A liquid crystal material and V<V_t. Ultimately, the parallel polarized component beam reaches the type B location 179' (V=0) to be reflected into port 163.

Now, with respect to the perpendicular polarization component, it passes through location 175', since type B material is used there and V=0. That light ray is reflected three times by mirror 191 and twice by type B nematic material between electrode pairs 186, 187 with V<V_t further to pass through location 179', joining the original parallel polarized component coaxially at output port 163. Inspection of FIGS. 11, 11A will give assurance that port 160 or 180 may readily be coupled to any one of ports 161, 162, 163, 182, 183, 195 (or vice versa). Referring only to operation with an input at port 160, by way of example, light may be directed to any of the six output ports by placing voltages V=0 or V>>V_t on selected electrode pairs, as follows:

| ACTIVATED ELECTRODE | | | | | | | | Output |
| 175 | 157 | 186 | 158 | 187 | 177 | 178 | 179 | PORT |
| --- | --- | --- | --- | --- | --- | --- | --- | --- |
| OFF | ON  | OFF | OFF | ON  | OFF | OFF | OFF | 161 |
| OFF | OFF | ON  | ON  | OFF | OFF | OFF | OFF | 162 |
| OFF | OFF | ON  | OFF | ON  | OFF | OFF | OFF | 163 |
| OFF | OFF | ON  | OFF | ON  | OFF | OFF | ON  | 182 |
| OFF | OFF | ON  | ON  | OFF | OFF | ON  | OFF | 183 |
| OFF | ON  | OFF | OFF | ON  | ON  | OFF | OFF | 195 |

It will be seen that the program for directing and recombining the two polarized light components entering the second input port 180 and separating almost at once will be similar with the exception that the voltage V>>V_t will always be present at the location 175' of electrodes 175.

Figure 12:
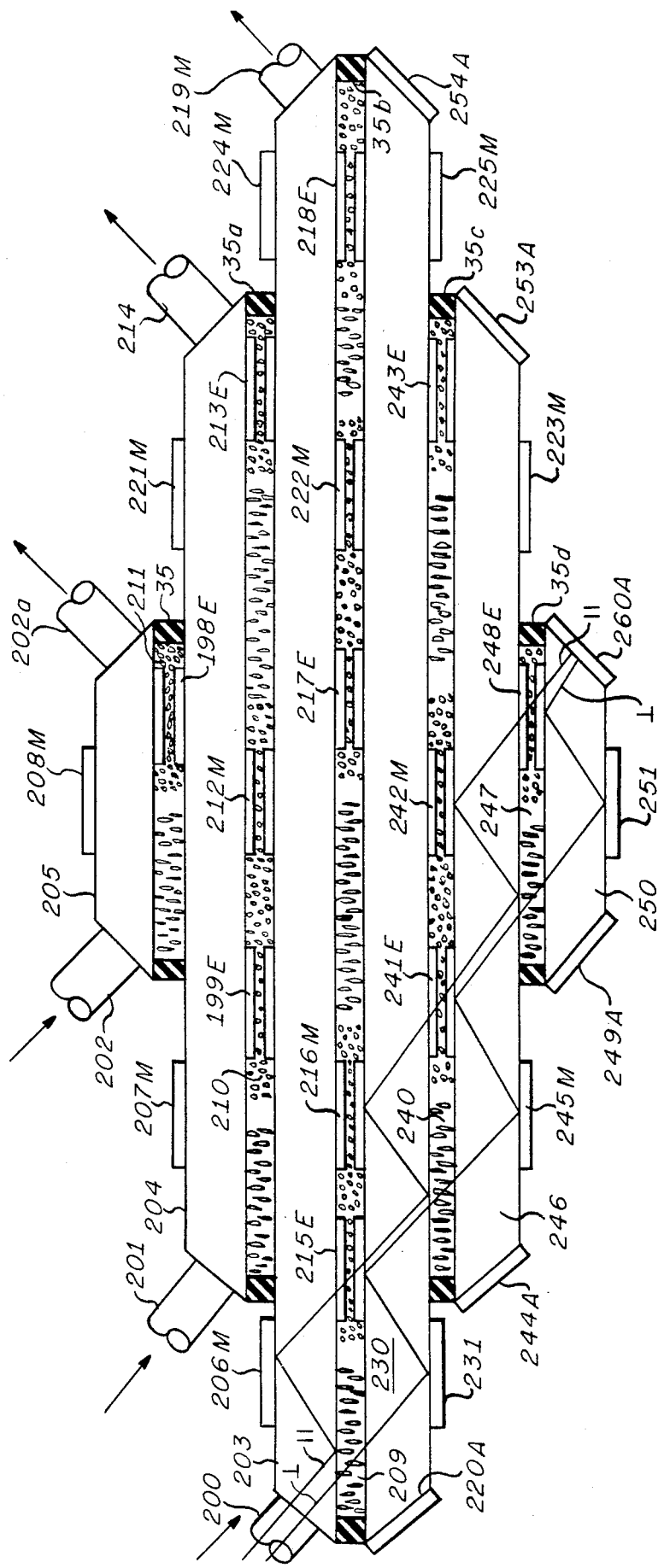
FIG. 12 is a view, partly in cross section, of a matrix switch having five electrooptically active layers, each composed only of liquid crystal material.

FIG. 12 represents a novel matrix form of the invention employing a building block such as illustrated in FIG. 9 wherein different treatments are given to prism surfaces at different light beam intersections with liquid crystal layers. The structure, a 3 by 3 example of an N by N structure, is partially symmetric about the central liquid crystal layer and each liquid crystal layer utilizes a plurality of the unit switch cells of the aforementioned kind in a configuration desirably requiring no barriers and no index-matching regions, the entire lengths of each layer being occupied by liquid crystal fluid. The latter layers are set up between prisms 204, 205; 203, 204; 203, 230; 230, 246; and 246, 250. Prisms 205, 250; 204, 246; and 203, 230 are similarly formed.

The upper tier prism has the usual angled end faces with fiber optic input end guides 202, 202a and a mirror element 208M at a mid-portion of upper surface. The liquid crystal layer 211 defined within peripheral wall 35 includes two equal sized regions. One, the region 197, is electrically undisturbable and is generated by the use of appropriate surface treatment of the cooperating adjacent non-electroded surfaces of glass prisms 204, 205. The other region has a transparent electrode pair 198E between which the liquid crystals are oriented parallel to the prism surfaces along the x direction of FIG. 9 for V<V_t. The passive region 197 has molecules oriented perpendicular to the prism surfaces.

The second tier prism 204 includes external mirrors 207M and 221M on each side of liquid crystal layer 211 which cooperate with mirrors 216M and 222M, respectively, and has abutting fiber optic input and output guides 201, 214 at its opposite angled faces. With the larger prism 203 and the peripheral wall 35a, it defines a second liquid crystal layer 210 employing a single type of liquid crystal material and that only. Beginning at the left end of layer 210, it includes an electrically undisturbable region where the molecular axes remain vertical. Next is a region with a pair 199E of transparent electrical electrodes and a pair of mirrors 212M both in a region where the surface treatment of the layer causes the long axes of the molecules to be parallel to the prism surfaces for $V<V_t$. Next, a second undisturbable region with molecular alignment perpendicular to the prism surfaces appears. Finally, the layer includes a pair 213E of transparent electrodes which, at $V<V_t$, again cause the parallel orientation of the molecular axes, as at 199E.

The third tier prism 203 includes external mirrors 206M, 224M on each side of liquid crystal layer 210 and has abutting fiber optic guides 200, 219 at its opposite angled faces. With a similar, but inverted large prism 230, it defines a third liquid crystal layer employing only a single type of liquid crystal material. Beginning at the left end of layer 209, the layer 209 includes a region in which the molecular axes are never disturbed from their perpendicular relation with respect to the adjacent prism surfaces, a horizontal molecular axis region when $V<V_t$ and defined between transparent electrodes 215E and continuing between a pair 216M of opposed mirrors, an undisturbable region, a second horizontal molecular axes region for $V<V_t$ defined between transparent electrodes 217E, that region extending between a cooperating pair of mirrors 222M, a third undisturbable region, and a final pair 218E of transparent electrodes defining a region in which the molecular axes lie horizontally for $V<V_t$, all orientations being as illustrated in FIG. 12.

In general, the fourth, fifth, and sixth tiers formed by the respective prisms 230, 246, 250 and the intervening liquid crystal layers 209, 240, 247 are mirror images of the structure thus far discussed. In the figure, optical absorbers 220A, 244A, 249A, 260A, 253A, and 254A are placed on the respective angled faces of the third, fourth, and fifth tier prisms, but it will be understood that in many applications, fiber optic input or output devices may be substituted.

It will be understood, for instance, that various paths may be set up through the structure by appropriate activation of the electric fields between the several transparent electrode pairs as taught herein. For example, unpolarized light having both perpendicular and parallel components entering input guide 200 follows the indicated separate paths of FIG. 12 to absorber or output 260A when $V<V_t$ on all electrode pairs in that path. Such light entering guide 201 would be directed to absorber or output 253A in the unaddressed $V=0$ condition on all electrodes. Further, light entering port 202 with $V<V_t$ anywhere would propagate to absorber or output 254A. For crossbar switching, selective operation of the appropriate switches 199E or 217E or 243E causes all of the light entering port 201, for example, to flow to any of the three opposite ports 202a, 214, 219. By similar addressing, unpolarized fiber light entering ports 200 and 202 can be sent totally to those same output ports simultaneously in one-to-one mapping. In other words, a primary application of the FIG. 12 device is as a low loss optical crossbar or network control switch in which three out of nine switches:

| 198E | 213E | 218E |
| 199E | 217E | 243E |
| 215E | 241E | 248E | are ON at any one time, the remainder being OFF; that is, one switch in each row and each column of the matrix is addressed, which gives one of the six possible optical interconnections of the fibers 200, 201, 202 with fibers 202a, 214, 219 and which represents an N-fold pairing.

Accordingly, it is seen that the invention provides in a variety of embodiments, novel electrooptical apparatus for switching pluralities of optical data-bearing streams between single and plural input and single and plural output fiber optic light guides of the single strand, multimode type by selective electric field excitation of nematic liquid crystal materials. The technique employs alternately arranged glass prisms and liquid crystal layers in symmetric or asymmetric forms. Matrix switching of randomly polarized or unpolarized light is readily achieved with low insertion loss, low cross-talk, and low control voltages. Versatile in nature so that many different switching configurations may be enjoyed, the embodiments of the invention avoid the problems of the prior art, while additionally making use of the advantages of liquid crystal media and of multimode, single strand operation. Switching is accomplished in a manner overcoming the defects of the prior art; for example, means are provided rendering operation independent of the polarization of the incoming light. Some embodiments of the invention are further advantageous because the selected nematic material, in cooperation with the selected disposal of mirrors and electrooptically active regions defined between transparent electrodes, makes it possible to use only one liquid crystal material extending throughout the total volume of each liquid crystal layer, eliminating internal barriers and the need for index-matching fluids.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. An optical switching matrix comprising:
    first port means for propagating an input light beam having components in first and second linearly polarized states so as to intersect, at a predetermined angle and at a first location, a confined layer of electrooptically active nematic material for reflection of said first polarized state component and for transmission therethrough of said second polarized state component for forming respective second and third divergent light beams,
    polarization converter means for interchanging the respective polarizations of said respective second and third divergent light beams, and
    reflector means for redirecting said second and third light beams so as to intersect, at said predetermined angle and at a second location, said confined layer for redirecting said second and third light beams to form a combined light beam, said combined light beam propagating through second port means in substantially the same direction as said input light beam.

2. Apparatus as described in claim 1 wherein said polarization converter means is disposed between said first port means and said reflector means.

3. Apparatus as described in claim 1 wherein said polarization converter means is disposed at said reflector means in contiguous relation therewith.

4. Apparatus as described in claim 3 wherein said layer of electrooptically active nematic material is confined between first and second spaced-apart transparent bodies having respective opposed first and second parallel surfaces at said layer.

5. Apparatus as described in claim 4 wherein each of said spaced-apart transparent bodies has first and second transparent end faces disposed at said acute angle with respect to said first or second parallel surfaces.

6. Apparatus as described in claim 5 wherein said acute angle is selected from an operative range of angles greater than the critical angle $\theta_c$ of total internal reflection of the material of said transparent body.

7. Apparatus as described in claim 5 wherein said acute angle lies substantially between $\theta_c+1°$ and $\theta_c+7°$, where $\theta_c$ is the critical angle of internal reflection of the material of said transparent body.

8. Apparatus as described in claim 5 wherein said acute angle is substantially $\theta_c+2°$, where $\theta_c$ is the critical angle of internal reflection of the material of said transparent body.

9. Apparatus as described in claim 5 wherein each said transparent body includes six planar sides, two sides taking the form of substantially parallel trapezoids each having only two equal sides.

10. Apparatus as described in claim 5 wherein said first and second port means are affixed in perpendicular abutted relation respectively to selected ones of said respective end faces.

11. Apparatus as described in claim 10 wherein said transparent bodies each include an outer surface parallel to said first and second surfaces adapted to serve as said reflector means.

12. Apparatus as described in claim 11 wherein said respective reflector means are mounted centrally upon said respective first and second outer surfaces in parallel relation thereto.

13. Apparatus as described in claim 12 wherein said polarization converter means is disposed between each said reflector means and said respective first and second surfaces.

14. Apparatus as described in claim 5 wherein said polarization converter means are disposed within said transparent body means at said acute angle to said first and second parallel surfaces.

15. Apparatus as described in claim 5 wherein said polarization converter means are disposed within said transparent body means at right angles to said first or second parallel surfaces.

16. Apparatus as described in claim 1 further including unitary means for imposing an electric field simultaneously across said confined layer of electrooptically active nematic material at said first and second locations.

17. Apparatus as described in claim 16 wherein said layer of electrooptically active nematic material is characterized by orientation of the long axes of the molecules thereof parallel to said layer and in a direction parallel to the optical incidence plane in the absence of an enabling electric field thereacross.

18. Apparatus as described in claim 1 further including means for selectively imposing discrete electric fields across said confined layer of electrooptically active nematic material at said first and second locations.

19. Apparatus as described in claim 18 wherein:
said means for selectively imposing electric fields at said first and second locations comprises transparent first and second pairs of transparent electrodes, and said polarization converter means comprises halfwave plate substrate means in contiguous relation with one of the electrodes of each of said first and second pairs of transparent electrodes.

20. Apparatus as described in claim 19 wherein said layer of electrooptically active nematic material is characterized by orientation of the long axes of the molecules thereof parallel to said layer in a direction parallel to the optical incidence plane in the absence of enabling electric fields at said first and second electric fields.

21. An optical switching matrix comprising:
at least first and second transparent prismatic bodies,
first port means affixed to one of said bodies for propagating an input light beam having components in first and second lineally polarized states so as to intersect, at a predetermined angle and at a first location, a layer of electrooptically active nematic material confined between parallel disposed spaced sides of said first and second transparent prismatic bodies for reflection of said first polarized state component and for transmission therethrough of said second polarized state component for forming respective second and third divergent light beams, the spatial splitting of said second and third beams occurring in the absence of an enabling electric field at said first location,
reflector means for redirecting said second and third light beams so as to intersect, at said predetermined angle and at a second location, said confined layer for redirecting said second and third light beams to form a combined light beam with the structure of said optical switching matrix being so configured that the respective polarization states of said respective second and third divergent beams remain unchanged before recombination thereof,
second port means affixed to the first of said bodies for the output propagation of said combined light beam when an enabling electric field is absent at said second location, the light flow in the second port being substantially at 46° to said input light beam, and
third port means affixed to the second of said bodies for the output propagation of said combined light beam when an enabling electric field is present at said second location, the light flow in said third port being in the same direction as said input beam.

22. Apparatus as described in claim 21 further including means for selectively imposing an electric field across said confined layer of electrooptically active nematic material only at said second location.

23. Apparatus as described in claim 21 wherein said means for selectively imposing an electric field at said second location comprises opposed transparent electrodes respectively affixed to said first and second transparent prismatic bodies at said second location remote from said first location.

24. Apparatus as described in claim 23 wherein said layer of electrooptically active nematic material is characterized by orientation of the long molecular axes thereof parallel to the plane of said layer in a direction perpendicular to the optical incidence plane in the absence of an enabling electric field at said second location.

25. Apparatus as described in claim 23 wherein said layer of electrooptically nematic material is characterized by orientation of the long molecular axes thereof perpendicular to the plane of said layer in the presence of an enabling electric field at said second location.

26. An optical switching matrix comprising,
first, second and third transparent prismatic bodies in spaced apart relation for defining first and second electroactive regions,
first and second electrooptically active layer means respectively disposed in contiguous first and second locations within said first electroactive region,
third and fourth electrooptically active means disposed in respective spaced apart third and fourth locations within said second electroactive region,
electrooptically inactive means disposed between said third and fourth locations,
said first, second, third, and fourth electrooptically active layer means including electrooptically active nematic material selectively activatable by associated electric fields at said respective first, second, third, or fourth locations and cooperating with said electrooptically inactive means for selectively transmitting light incident at a predetermined angle at said first or third location therethrough or for reflecting same.

27. Apparatus as described in claim 26 further including:
input light port means affixed one each to each of said bodies for selectively illuminating said first or third electrooptically active layer means, and
output light port means affixed one each to each of said bodies opposite said input light port means for receiving light selectively reflected at least from or transmitted through said second or fourth electrooptically active layer means.

28. Apparatus as described in claim 27 wherein:
said first and third transparent prismatic bodies have respective outer surfaces respectively opposite said first and second electroactive regions,
first reflector means at said outer surface of said first transparent prismatic body for directing incident light into said second optically active layer means, and
second reflector means at said outer surface of said transparent prismatic body for directing light into said electrooptically inactive means or into said fourth optically active layer means.

29. Apparatus as described in claim 28 wherein said first, second, third, and fourth electrooptically active means comprise the same nematic material and the molecular long axes thereof lie parallel to the respective planes of said electrooptically active means in a direction perpendicular to the optical incidence plane in the absence of enabling electric fields.

30. Apparatus as described in claim 29 wherein the optical index of said electrooptically inactive means matches that of said first, second, third, and fourth transparent prismatic bodies.

31. Apparatus as described in claim 26 wherein:
each of said first, second, and third transparent prismatic bodies is characterized by symmetry about a respective plane, and
each of said first, second, and third transparent prismatic bodies is so disposed that said respective planes are aligned whereby said optical switching matrix is characterized by planar geometrical symmetry.

32. An optical switching matrix comprising:
first, second, third, fourth, and fifth transparent prismatic bodies in spaced apart relation for defining therebetween first, second and third electroactive regions,
first and second electrooptically active layer means respectively disposed centrally in contiguous side-by-side relation within said first electroactive region,
first and second electrooptically inactive regions respectively disposed on each side of said first and second electrooptically active layer means and coplanar therewith,
third, fourth, fifth, and sixth electrooptically active layer means respectively disposed in coplanar relation within said second electroactive region, said third electrooptically active layer means being disposed at one end of said second electroactive region, said fourth, fifth, and sixth electrooptically active layer means being disposed in contiguous coplanar relation and spaced apart from said third electrooptically active layer means at a second end of said second electroactive region,
seventh and eighth electrooptically active layer means respectively disposed centrally in contiguous relation within said third electroactive region, and
third and fourth electrooptically inactive regions respectively spaced on each side of said seventh and eighth electrooptically active layer means and coplanar therewith.

33. Apparatus as described in claim 32 wherein:
said first and second electrooptically active layer means is characterized by molecular long axis disposition in a first direction, and
said third, fourth, fifth, sixth, seventh, and eighth electrooptically active layer means are characterized by molecular axis disposition at right angles to said first direction, both in the absence of an enabling electric field.

34. Apparatus as described in claim 32 wherein said first, second, third, fourth, fifth, sixth, seventh, and eighth electrooptically active layer means include optically active nematic material selectively activatable by associated electric fields and cooperating selectively with said first, second, third, and fourth optically inactive means for transmitting light incident at a predetermined angle at said third electrooptically active layer therethrough or for reflecting the same.

35. Apparatus as described in claim 34 further including:
input light port means affixed one each to each of said second and third transparent prismatic bodies for selectively illuminating said third electrooptically active means, and
at least one light output port means affixed one each to each of said bodies opposite said input light port means for receiving light selectively reflected from or transmitted through said first, second, third, fourth, fifth, sixth, seventh, or eighth optically active layer means.

36. Apparatus as described in claim 35 wherein:
said first and fourth transparent prismatic bodies have respective outer surfaces opposite said first and third electroactive regions,
first reflector means at said outer surface of said first transparent prismatic body for directing incident light into said first or second optically active means or into said second electrooptically inactive region, and
second reflector means at said outer surface of said fourth transparent prismatic body for directing light into said seventh or eighth electrooptically active means or into said fourth electrooptically inactive means.

37. Apparatus as described in claim 32 wherein the optical index of said electrooptically inactive means matches that of said first, second, third, and fourth transparent prismatic bodies.

38. Apparatus as described in claim 32 wherein said first, second, third, fourth, fifth, sixth, seventh, and eighth optically active means include positive anisotropy nematic liquid crystal material.

39. Apparatus as described in claim 32 wherein:
 each of said first, second, third, and fourth transparent prismatic bodies is characterized by symmetry about a respective plane, and
 each of said first, second, third, and fourth transparent prismatic bodies is so disposed that said respective planes are aligned whereby said optical switching matrix displays planar geometrical symmetry.

* * * * *